US008325364B2

(12) United States Patent
Weber et al.

(10) Patent No.: US 8,325,364 B2
(45) Date of Patent: Dec. 4, 2012

(54) METHOD AND CONVERTER UNIT TO TRANSFER CONTROL INFORMATION BETWEEN AT LEAST TWO PROCESSING UNITS OF A PRINTING OR COPYING SYSTEM

(75) Inventors: Johannes Weber, Poing (DE); Timo Sponer, Markt Schwaben (DE)

(73) Assignee: Océ Printing Systems GmbH, Poing (DE)

( * ) Notice: Subject to any disclaimer, the term of this patent is extended or adjusted under 35 U.S.C. 154(b) by 912 days.

(21) Appl. No.: 12/402,083

(22) Filed: Mar. 11, 2009

(65) Prior Publication Data

US 2009/0231616 A1     Sep. 17, 2009

(30) Foreign Application Priority Data

Mar. 17, 2008 (DE) .................. 10 2008 014 631

(51) Int. Cl.
*G06F 3/12* (2006.01)
(52) U.S. Cl. ...................................... 358/1.15
(58) Field of Classification Search ............... None
See application file for complete search history.

(56) References Cited

U.S. PATENT DOCUMENTS

| 6,786,149 | B1 | 9/2004 | Lomoine et al. |
| 2007/0277693 | A1 | 12/2007 | Drexler |
| 2010/0073717 | A1* | 3/2010 | Debaere ............... 358/1.15 |

FOREIGN PATENT DOCUMENTS

| DE | 10 2006 025 454 | 12/2007 |
| DE | 10 2007 019 312 | 11/2008 |
| EP | 1 464 506 | 10/2004 |

OTHER PUBLICATIONS

Universal Printer Pre-and Post-processing Interface, Oct. 2004, Version 1.04.*
Universal Printer Pre-and Post-Processing Interface—Version 1.20—Nov. 2004.
JDF—Spezifikation zum Austausch von Datenformaten im Druckprozess, Version 1.3 vol. 30 Sep. 2005.
UPI Integrated Digital Priting Forum Apr. 5, 2006—Peter Dyson of Duplo.
Mikrocomputer-technik—Hanser—2007.

* cited by examiner

*Primary Examiner* — Marivelisse Santiago Cordero
*Assistant Examiner* — John Wallace
(74) *Attorney, Agent, or Firm* — Schiff Hardin LLP (57) ABSTRACT

In a converter unit to convert control information to be transferred between at least first and second processing units of a printing or copying system, at least one first data interface is provided according to a first interface standard for exchange of control information between the converter unit and at least the first processing unit. A control signal interface is provided for at least one signal line between the converter unit and the first processing unit, the signal line being associated with one control signal. At least one real-time-capable second data interface according to a second interface standard is provided for exchange of control information between the converter unit and at least the second processing unit. The converter unit converts data conforming to a signal state of the control signal into data according to the second interface standard and conforming to the real-time-capable second data interface. The converter unit outputs the data according to the second interface standard via the second data interface or converts real-time-relevant data supplied to the converter unit via the second data interface into a signal curve of the control signal corresponding to the data and outputs the signal curve via the control signal interface.

16 Claims, 5 Drawing Sheets

METHOD AND CONVERTER UNIT TO TRANSFER CONTROL INFORMATION BETWEEN AT LEAST TWO PROCESSING UNITS OF A PRINTING OR COPYING SYSTEM

BACKGROUND

The preferred embodiment concerns a converter unit and a method to transfer control information between at least two processing units of a printing or copying system that respectively have at least one data interface for exchange of control information.

Known high-capacity printing or high-capacity copying systems with printing capacities greater than 100 sheets DIN A4 per minute and printing speeds of up to more than 2 m per second typically comprise pre- and/or post-processing units that are often executed as separate modules and that are coupled with at least one image generation unit. The at least one image generation unit and the pre- and/or post-processing units are arranged in succession in a paper travel direction indicating production direction in order to serially process the substrate material. The paper travel direction is generally the transport direction of the substrate material through the respective high-capacity printing or high-capacity copying system. A high-capacity printer or high-capacity copier is advantageously used as an image generation unit of the high-capacity printing or high-capacity copying system.

The control and coordination of the processing steps of the individual processing units requires an exchange of data with processing information between the processing units of the printing or copying system. In particular in the processing of web-shaped substrate material, a real-time processing of the processing information pertaining to the paper travel is required in order to control the processing steps of the individual processing unit and to attune them to one another. The desire and the requirement thereby exist to be able to combine apparatuses of different manufacturers into a printing or copying system in that the individual apparatuses are arranged in series such that they advantageously form a complete printing path. Depending on the type and the requirements for the production of a printing result to be produced, the printing path can also comprise multiple printing units as well as auxiliary apparatuses such as, for example, stackers, cooling sections, re-humidifiers, cutting, folding, binding, stapling or stitching, enveloping, franking and/or packaging units.

In order to be able to satisfy continually increasing requirements for the processing workflow in the production of printing products, print job chaperone data are known in the prior art, in particular what are known as job ticket data that are exchanged between multiple software and/or hardware systems in addition to a print data stream or document data stream. Applications are also known in which job ticket data are inserted into the print data stream. The job ticket data are advantageously stored in a separate file and advantageously correspond to a job definition format known as a JDF. It is also known to provide a job messaging format (which is designated as a JMF) in addition to the job definition format. An industry consortium has agreed upon the JDF specification for exchange of data formats in the printing process, which specification exists (as of the point in time of the present patent application) as version 1.3 from 30 Sep. 2005 and can be downloaded via the Internet site http://www.cip4.org.

For data exchange between the processing units of high-capacity printing systems and/or high-capacity copying systems, it is also known to provide for this a specialized, standardized data interface. Such a data interface known as a $UP^3I$ (Universal Printer, Pre- and Post-Processing Interface) has been standardized by an industry consortium. An exchange of data with processing information (in particular of control information) between printing apparatuses and pre- and post-processing units that can be combined with these printing apparatuses, as well as with an operating unit integrated into a processing unit and/or with a separately arranged operating unit, is possible in a simple manner with the aid of the $UP^3I$ data interface. For the $UP^3I$ interface, processing information (in particular as control commands and incident reports) that is typical for the processing units and the production workflow of a printing path, are standardized in the interface commands of the $UP^3I$ interface. Details regarding this $UP^3I$ interface as well as regarding the standard of the $UP^3I$ interface that is present in the current version 1.20 from 2 Nov. 2004 are published on the Internet site http://www.UP3I.org at the point in time of the application.

It is desirable that a complete page tracking in the processing of individual sheets as well as a complete form tracking in the processing of web-shaped substrate material is ensured with the aid of the data exchange between the individual processing units of a printing system, and that the required error correction techniques are determined and executed if an error occurs. These error correction techniques in particular are to determine whether the printing and the processing of individual pages or forms must be repeated, and if yes the pages or forms that must be repeatedly generated are to be determined automatically. This is in particular desirable in the production of comparably complex and large print jobs (for instance in the production of books) so that the entire partially produced print job is not classified as defective and the print pages already generated have to be separated out as spoilage or maculature.

The printing unit or the printing units generally form the boundary between the pre-processing units and the post-processing units. Depending on the type and design of the printing unit and the processing requirements specified by the print job, arrangements are also selected in which multiple printing apparatuses are arranged in series. Depending on the type and design of the printing apparatus that forms the image generation unit, this is in the position to print images with one or more colors on the front and/or back side of the substrate material to be printed. What are known as twin or triple configurations of multiple printing apparatuses can thereby also be provided that are comprised of two or three printing apparatuses between which intermediate processing units can also be provided, in particular turners, buffer units (paper buffers), cooling and/or humidifying units.

Pre-processing units are, for example, unrolling units, single sheet feeder units (what are known as feeders), mark printing devices to generate pressure markings etc. Post-processing units are, for example, stitching machines, cutting machines, folding machines, binding machines, devices to inject additional sheets etc.

In addition to the $UP^3I$ data interface for data exchange between the individual processing units of a printing system, proprietary solution approaches for the exchange of control information are known. However, a multitude of these interfaces are not standardized, whereby the exchange of processing information (in particular of control signals) must be adapted for processing units to be combined with one another. For example, what is known as a Type 1 interface was defined by Siemens AG at the beginning of the '90s, which interface has been used in a plurality of high-capacity printers as an interface to couple these printers with pre- and/or post-processing units. For example, the Type 1 interface has eleven desired use signals that are unidirectional and connect the multiple processing units with the printing system via optocouplers, independent of potential. A similar interface has been defined as the DFA Level 1 interface by the Xerox Corporation.

Starting from such proprietary solutions, the aforementioned standard for UP³I has been developed in order to enable a continuous communication within a digital printing path with apparatuses (i.e. processing apparatuses) of different manufacturers. A high degree of automation of the printing path can be achieved via the use of apparatuses with a respective UP³I interface and via a corresponding data exchange of data with processing information. In particular, UP³I enables automated job exchange as well as a central control and a central monitoring of all apparatuses of the printing path, whereby what is known as a single point of operation is possible.

In principle it is provided to use UP³I both in single sheet printing systems and in printing systems for the printing of web-shaped substrate material. However, the UP³I interface is presently used only for single sheet printing systems since—in spite of the desire for a real-time capability of the UP³I interface that is formulated in the UP³I standard—a real-time-capable processing of data with processing information is not possible with the aid of the UP³I interface. In single sheet printing systems, a time-critical paper travel control is presently avoided in that the processing information are already transferred to the respective processing unit before the arrival of a single sheet, whereby, if this processing unit detects the arrival of the respective single sheet with the aid of a sheet edge sensor, the processing information associated with this single sheet is used for its processing.

No printing path for continuous printing (i.e. for processing of web-shaped substrate material) in which UP³I is used for paper travel control at printing speeds of 1 m per second and faster is presently known anywhere in the world that actually functions in practice for high-capacity printers, since the processing of the web-shaped substrate material with the aid of various processing units requires a real-time processing, at least of a portion of the paper travel information; UP³I presently does not provide such a real-time processing with the reliability that is necessary for practical use.

In known high-capacity printing or high-capacity copying systems, given web-shaped substrate material barcodes are printed on the web-shaped substrate material (advantageously on each form to be processed) for form tracking as well as for paper travel control, which barcodes are then read by barcode readers of the individual processing units in order to verify the position of the substrate material and to identify individual print form regions. Corresponding processing information can thereby be applied at the correct region of the web-shaped substrate material.

The data transfer of the UP³I interface defined in the standard is also physically based on a Firewire data connection between the individual data processing units according to the IEEE 1394 standard. The physical transmission layer, the connection layer for conversion of transaction requests into packets and to secure transactions given transmission errors, the transaction layer for an asynchronous, secure transfer of data between the processing units, and a bus management layer for bus configuration and management activities according to the IEEE 1394 standard are thereby used. Building on this data transmission, a transport layer and at least one application layer are defined by the UP³I interface.

However, in practice problems occur given data connections according to the IEEE 1394 standard in an industrial printing technology environment. In particular, the data transmission according to the IEEE 1394 standard with modules available on the market is susceptible to disruption due to electromagnetic influences, whereby in practice repeated problems have occurred in the transmission of data with processing information in printing systems. Furthermore, the existing hardware to provide data transmission connections according to the IEEE 1394 standard and to provide the IEEE 1394 layers required for the UP³I interface only a relatively small range of software and hardware are present, wherein the propagation of data interfaces according to the IEEE 1394 standard in new apparatuses outside of the industrial printing technology environment continuously decreases, and the range of interface modules for data interfaces according to the IEEE 1394 standard has also continuously decreased; many notable manufacturers no longer support this standard. Add to this that only one module (what is known as a link layer module) that can be connected with a microcontroller and that provides a data interface according to the IEEE 1394 standard is presently provided, wherein it cannot be foreseen how long this link layer module will still be available. Additional available IEEE 1394 interface modules have a PCI or PCIe interface and are thus usable only with data processing units that have a PCI bus or PCIe bus. It is thus to be expected that IEEE 1394 data interfaces will in the future still be supported only by larger data processing systems such as personal computers and blade servers, whereby the integration into simple pre- and/or post-processing apparatuses is not reasonable for economic reasons, and a UP³I interface can thereby no longer be provided for a plurality of processing units.

The realization of a UP³I data connection with a switched network connection as a physical transmission route between two processing units of a printing system is known from the German patent application DE 10 2007 019 312.4 (not previously published). In addition to the switched network connection, a real-time-capable bus system can also be provided as a UP³I data connection for transfer of signals in real time. The cited documents are herewith incorporated by reference into the present specification.

SUMMARY

It is an object to specify a converter unit and a method to transfer data between at least two processing units of a printing or copying system, via which the real-time-capable transfer of these data is possible in a simple and secure manner.

In a converter unit to convert control information to be transferred between at least first and second processing units of a printing or copying system, at least one first data interface is provided according to a first interface standard for exchange of control information between the converter unit and at least the first processing unit. A control signal interface is provided for at least one signal line between the converter unit and the first processing unit, the signal line being associated with one control signal. At least one real-time-capable second data interface according to a second interface standard is provided for exchange of control information between the converter unit and at least the second processing unit. The converter unit converts data conforming to a signal state of the control signal into data according to the second interface standard and conforming to the real-time-capable second data interface. The converter unit outputs the data according to the second interface standard via the second data interface or converts real-time-relevant data supplied to the converter unit via the second data interface into a signal curve of the control signal corresponding to the data and outputs the signal curve via the control signal interface.

DESCRIPTION OF THE PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

By providing the control signal interface for at least one signal line associated with only one control signal in addition to the first data interface, at least one real-time-capable signal input and/or output for the signal exchange with the first processing unit is available in the converter unit according to the preferred embodiment and the method according to the preferred embodiment, such that the converter unit can also incorporate the first processing unit into a real-time control function without the first data interface itself having to support a real-time processing of data. The converter unit converts the signal state of the signal line associated with the control signal into data conforming to the real-time-capable data interface of the second processing unit. Alternatively or additionally, the converter unit converts the real-time-capable data output by the second processing unit into a signal curve of the control signal that corresponds to the data. It is thereby achieved that existing printing apparatuses and existing pre- and/or post-processing units can be incorporated into a real-time-related control by the converter unit when at least one control signal required for the real-time processing is provided by these pre- and/or post-processing units via a signal line associated with this control signal and is supplied to the converter unit via the control signal interface.

The first interface standard is advantageously the $UP^3I$ standard, wherein the first data interface according to the $UP^3I$ standard has a configuration via which it is not suitable for real-time-capable data transfer. Processing units with a $UP^3I$ interface can thus also be incorporated into a real-time processing when the at least one control signal is provided via the signal line associated only with this control signal. It is also advantageous when the second processing unit has a network interface (advantageously with TCP/IP or UDP) in addition to the real-time-capable second data interface, wherein the network interface is connected via a switched network connection with the converter unit and/or an additional processing unit. The possible designs of such a network interface for transfer of non-real-time-relevant data and the additional provision of a real-time data connection between the processing units is described in detail in the previously unpublished German patent application DE 10 2007 019 312.4 by Océ Printing Systems GmbH, the content of which is incorporated by reference into the present specification.

The real-time-capable data interface is in particular an interface of a real-time-capable bus system, advantageously a real-time-capable field bus. Such a bus system is in particular the CAN bus prevalent in the automobile industry. The control information transferred via the real-time-capable data connection in particular pertains to a paper travel signal, advantageously a transport clock signal, a transport direction signal, a stop/release signal, specifications regarding form size, specifications regarding delay times, additional control information required in real time for the transport of the substrate material and/or additional control information required in real time for the temporal workflow of the printing process. At least one item of this information is converted with the aid of the converter unit into a signal curve of the control signal that corresponds to this information. Alternatively or additionally, the converter unit converts a real-time-relevant item of information (which item of information is output by the first processing unit with the aid of the signal curve of the control signal via the signal line associated only with this control signal) into data conforming with the real-time-capable data interface and transfers this to the second processing unit or supplies this as information to a real-time-capable bus system. The control signal can in particular be an analog or digital control signal, advantageously a binary signal such as a transport clock signal.

It is advantageous when the control signal interface of the converter unit, together with a control signal interface of the first processing unit and/or at least one additional processing unit, forms a control current loop to transfer the signal state of the control signal via the at least one signal line associated with the control signal and a reference potential, or via two signal lines associated with the control signal. For this the control signal interface for each control signal has at least one connection point that is connected or can be connected with the signal line associated with this control signal. Such signals transferred via separate signal lines are also designated as hard-wired control signals since the control signal is transferred via the respective signal state of the signal line. Such a transfer is very fast, such that a real-time transmission of information is possible via such signal lines associated with only one signal. In particular, no processing time is required to determine the signal state, as is required given the data transfer with the aid of data packets. The processing of transferred data packets advantageously occurs in multiple layers that respectively require a processing time that is undefined and unpredictable for real-time processing. The method with the features of the preferred embodiment can be developed in the same manner as specified for the converter unit, wherein the same advantages as explained in connection with the converter unit are achieved with the aid of this method.

Figure 1:
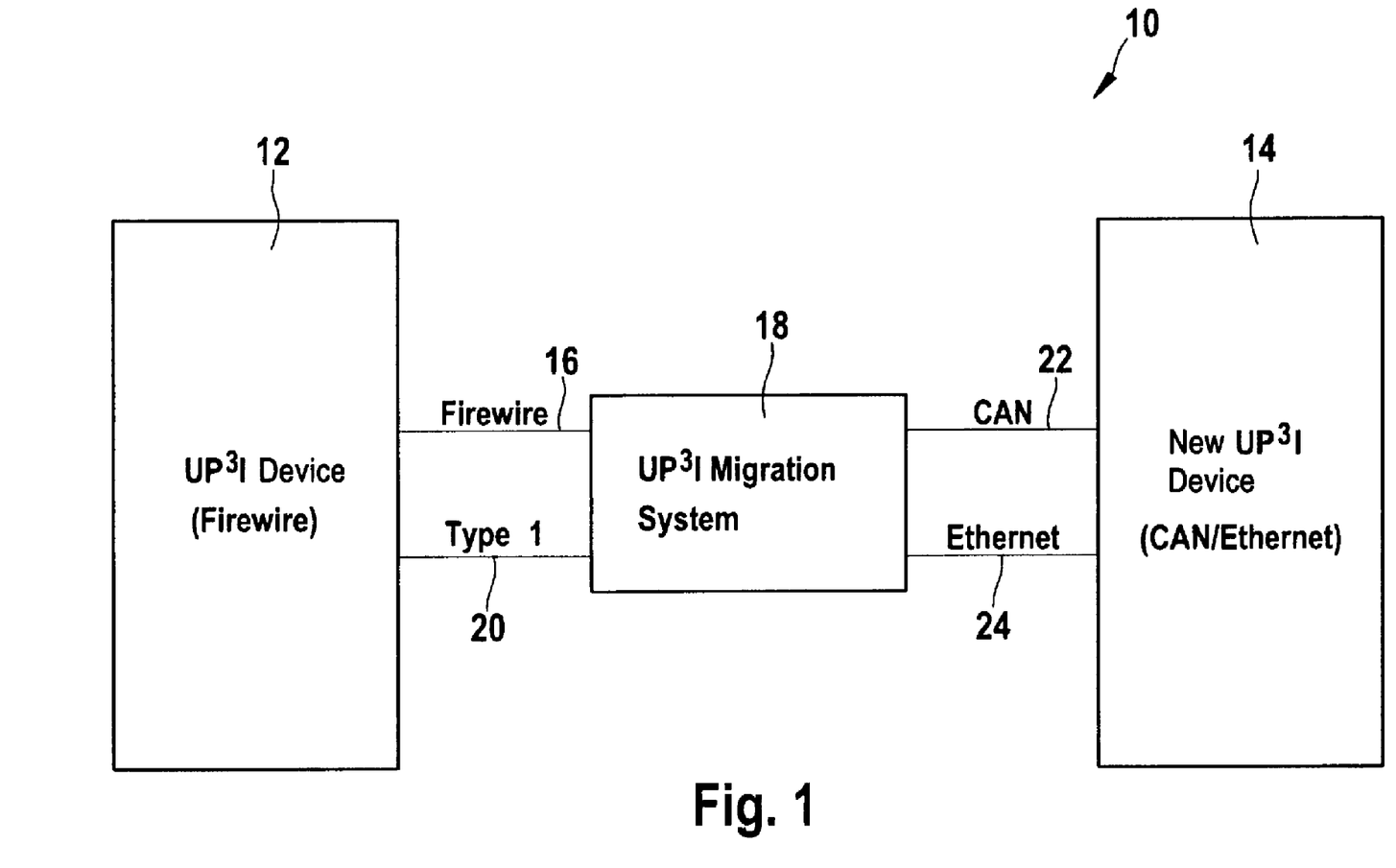
FIG. 1 is a block diagram of a printing or copying system with two processing units according to a first embodiment, wherein a data conversion of the data transferred by the different data interfaces of the processing units occurs.

A block diagram of a printing or copying system 10 with two processing units 12, 14 that are components of the printing or copying system 10 is shown in FIG. 1. The processing unit 12 is an image generation unit with at least one printing group for printing of web-shaped substrate material (such as a paper web). The processing unit 14 is a post-processing unit, in particular a cutting unit to cut the printed, web-shaped substrate material into individual print pages. The image generation unit 12 has a UP³I interface according to the applicable UP³I standard version 1.20. As already explained in detail in the specification preamble, the data are transferred via such a UP³I interface via a Firewire data connection according to IEEE 1394. The image generation unit 12 is connected via a Firewire data line 16 with a converter unit 18. The image generation unit 12 also has what is known as a Type 1 interface that has a plurality of unidirectional signal lines for the exchange with at least one additional processing unit of a respective control signal per signal line. These signal lines are directed to the converter unit 18 via a signal cable 20 so that the control lines of the Type 1 interface are provided to the image generation unit 12 in the converter unit 18. Control signals of the image generation unit 12 are thus provided in real time to the converter unit 18 via the Type 1 interface.

The converter unit 18 can also transfer control signals in real time to the image generation unit 12 via at least one part of the control lines. The converter unit 18 is also connected with the cutting unit 14 via a CAN bus connection 22. The CAN bus connection 22 enables a real-time-capable data transfer of control data between the converter unit 18 and the processing unit 14. Time-critical paper travel data and print control data are transferred via this data connection 22, for example a transport clock in which the substrate material is driven through the processing unit 12, 14, start/stop signals, transport direction signals and, if applicable, specifications regarding form size and/or form position of individual print pages on the web-shaped substrate material.

A switched network connection 24 according to the Ethernet standard is also provided between the converter unit 18 and the cutting unit 14 via a network switch (not shown). No real-time data transfer is possible via this network connection 24. However, such a network connection 24 enables the transfer of large data sets [quantities] between the converter unit 18 and the processing unit 14. In particular, program data of control programs of the processing units 12, 14, in particular firmware data, error data, event data, data for generation of operator interfaces for the operation of the processing units 12, 14, setting parameters and additional data that are not real-time-relevant, can be transferred via this network connection 24.

A real-time processing of control data in the printing or copying system 10 between the processing units 12 and 14 is thus possible via the data connection with the aid of the Type 1 interface and the real-time-capable CAN bus.

The mode of operation of converter units and/or data processing systems in which the data processing proceeds nearly simultaneously with the corresponding processes in reality (i.e. the processing processes executed by the processing units) is thereby viewed as real-time processing. The transmission routes for transfer of the data between the processing units must thereby be designed so that they allow a data transfer that enables such a real-time operation. The processing of the data can thereby occur without appreciable or observable delay at an event to be triggered, for example a feed of the substrate material by a specific transport distance. The data transfer route must thereby guarantee that the transmission of the corresponding data occurs within a predetermined time span or is concluded at a predetermined point in time after occurrence of an event to be trigged. It can thereby be ensured that a processing unit that receives the data and processes it further activates or implements the required actions promptly or exactly at a required point in time.

Large data sets can be transferred via the switched network connection. The transfer of relatively large data sets between the processing units of the printing or copying system can in particular be required given the configuration of the printing or copying system to transfer configuration information between the individual processing units of the printing or copying system. The configuration of the printing or copying system advantageously runs independently and automatically, wherein the data with the processing information and additional data with the configuration information are transferred between the processing units and/or between at least one processing unit and a separate control panel with the aid of the switched network connection. Such a separate control panel is, with regard to the data transfer, also a processing unit in the sense of the preferred embodiment. The transferred processing information can in particular also comprise program data, display data and configuration data.

The real-time-relevant control information is advantageously transferred between the processing units 12, 14 along the transport path of the substrate material to be processed (paper travel direction). This control information in particular comprises the aforementioned paper travel information, for example the feed of the substrate material that has occurred and/or is required in the individual processing units, stop signal etc. Form-related paper travel information are advantageously also generated, wherein a form in this context designates a print region such as a print page on a web-shaped substrate material, for example. The paper travel information is then advantageously transferred in connection with a form ID via the real-time-capable CAN bus connection. The form data themselves cannot be transmitted as control information via the Type 1 interface. However, the form information can already be transferred from the processing unit 12 to the converter unit 18 via the UP³I Firewire connection 16 before the transfer of the real-time-relevant control information with the aid of the Type 1 interface, and the form information can be linked together with control information by the converter unit 18 in the transfer of the associated paper travel signals via the Type 1 interface and be transferred to the processing unit 14 via the CAN bus connection 22.

The real-time-relevant data to be transferred via the CAN bus connection 22 can be transferred within agreed-upon, defined time periods. To ensure these time periods, what are known as slots can be provided in which defined data sets (data packets) can be transferred. These slots are repeatedly provided for that data transfer of preset, regular time intervals, such that a data transfer of defined data (for example the paper travel information) can occur at this point in time.

In the exemplary embodiment according to FIG. 1, a separation of data with processing information that require a real-time processing and the data with processing information that require no real-time processing occurs. The data that require a real-time processing are transferred between the converter unit 19 and the processing unit 12 as what are known as hard-wired hardware signals via the Type 1 interface and between the converter unit 18 and the processing unit 14 via a CAN bus connection 22. The data that require a real-time processing have a very small data volume. Additional data (in particular even large data sets) can be transferred via the Firewire data connection 16 and the Ethernet data connection. Corresponding log data and, if necessary, print data and/or raster image data that can be used for an error analysis can in particular be transferred via the data connections 16, 24 if error states have occurred. The network connection 24 is advantageously a standard Ethernet connection according to the TCP/IP or UDP protocols. Standard hardware and software can thereby be used to provide the interfaces required for the network connection 24 and for the data connection itself. This hardware and software is present on nearly all arbitrary platforms and can thereby be cost-effectively used.

Figure 2:
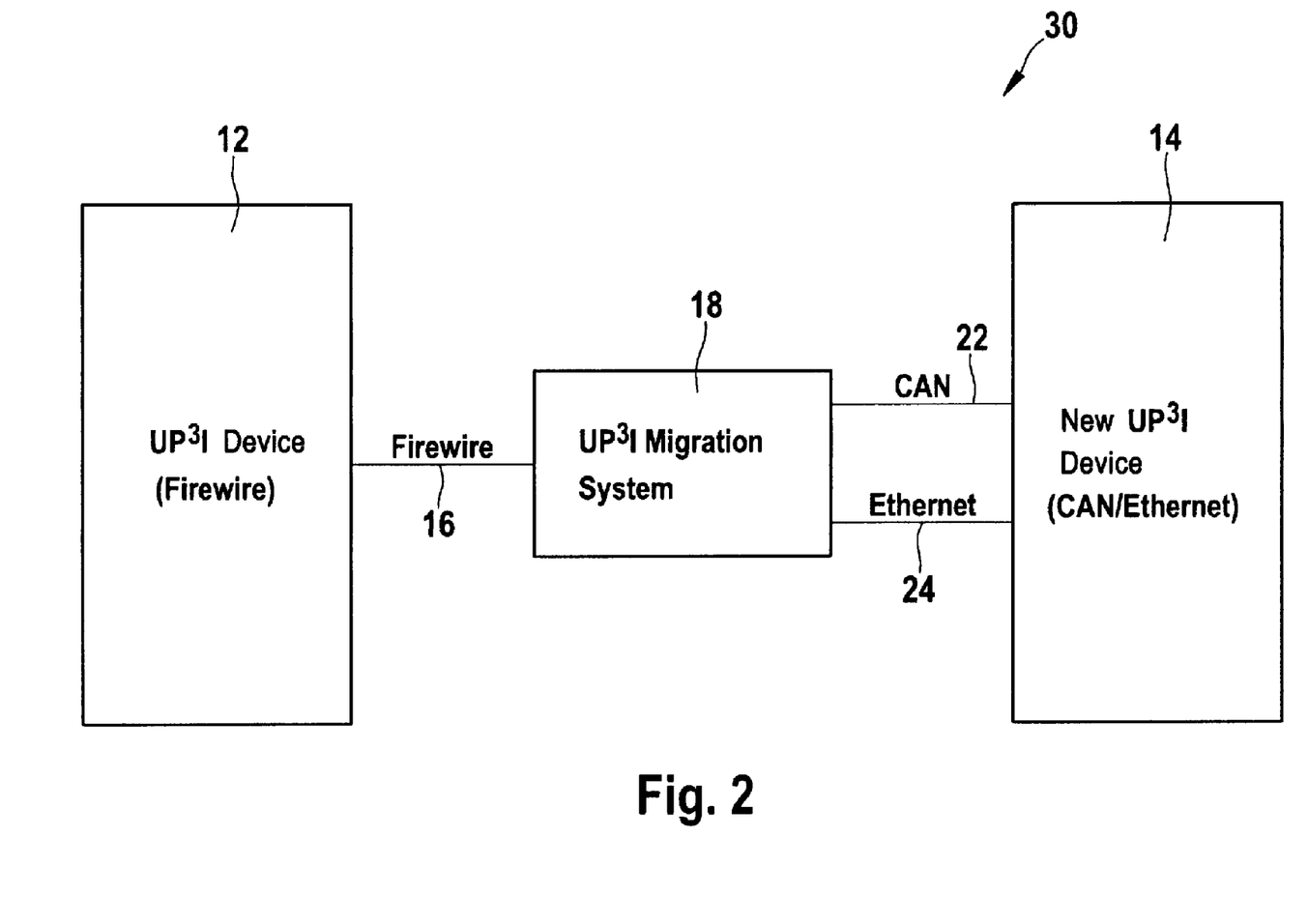
FIG. 2 is a block diagram of an additional printing or copying system with two processing units according to a second embodiment.

A printing or copying system 30 similar to the printing or copying system 10 according to FIG. 1 is shown in FIG. 2. Elements with the same design or the same function have the same reference character. In contrast to the printing or copying system according to FIG. 1, in the printing or copying system 30 according to FIG. 1 only the Firewire data connection to transfer UP³I control information is provided between the image generation unit 12 and the converter unit 18, and not the additional Type 1 interface. A real-time-capable data transfer between the processing unit 12 and the processing unit 14 is thereby not possible.

In other exemplary embodiments, only a CAN bus data connection can be provided between the processing unit 14 and the converter unit 18 if all required control information and administration information can be transferred via the CAN bus connection 22, and it is furthermore ensured that real-time-relevant control information can be transferred in the required time periods.

In particular the configuration and management information (as well as other processing information that do not require real-time processing) that are established in the UP³I standard can be transferred via the Firewire connection 16 and the network connection 24. These data can also comprise program data, display data and/or configuration data to provide user interfaces. Central operating units via which an operation of the individual processing units of the printing or copying system 10, 30 is possible can thereby be configured. What are known as single points of operation can thereby be provided in a simple manner according to the UP³I standard for all processing units 12, 14 of a printing path. A single point of operation is an operating unit via which all processing units can be monitored and controlled. The paper travel information established in the UP³I standard, or at least a portion of the paper travel information established in the UP³I standard as well as the additional paper travel information presently not established in the UP³I standard but required for the processing of web-shaped substrate material, are transferred via the CAN bus connection 22 and the Type 1 connection 20 between the processing unit 12 and the converter unit 18 or between the converter unit 18 and the processing unit 14. As an alternative to the real-time-capable CAN bus, a different, suitable real-time-capable data connection can also be provided between converter unit 18 and the processing unit 14.

Figure 3:
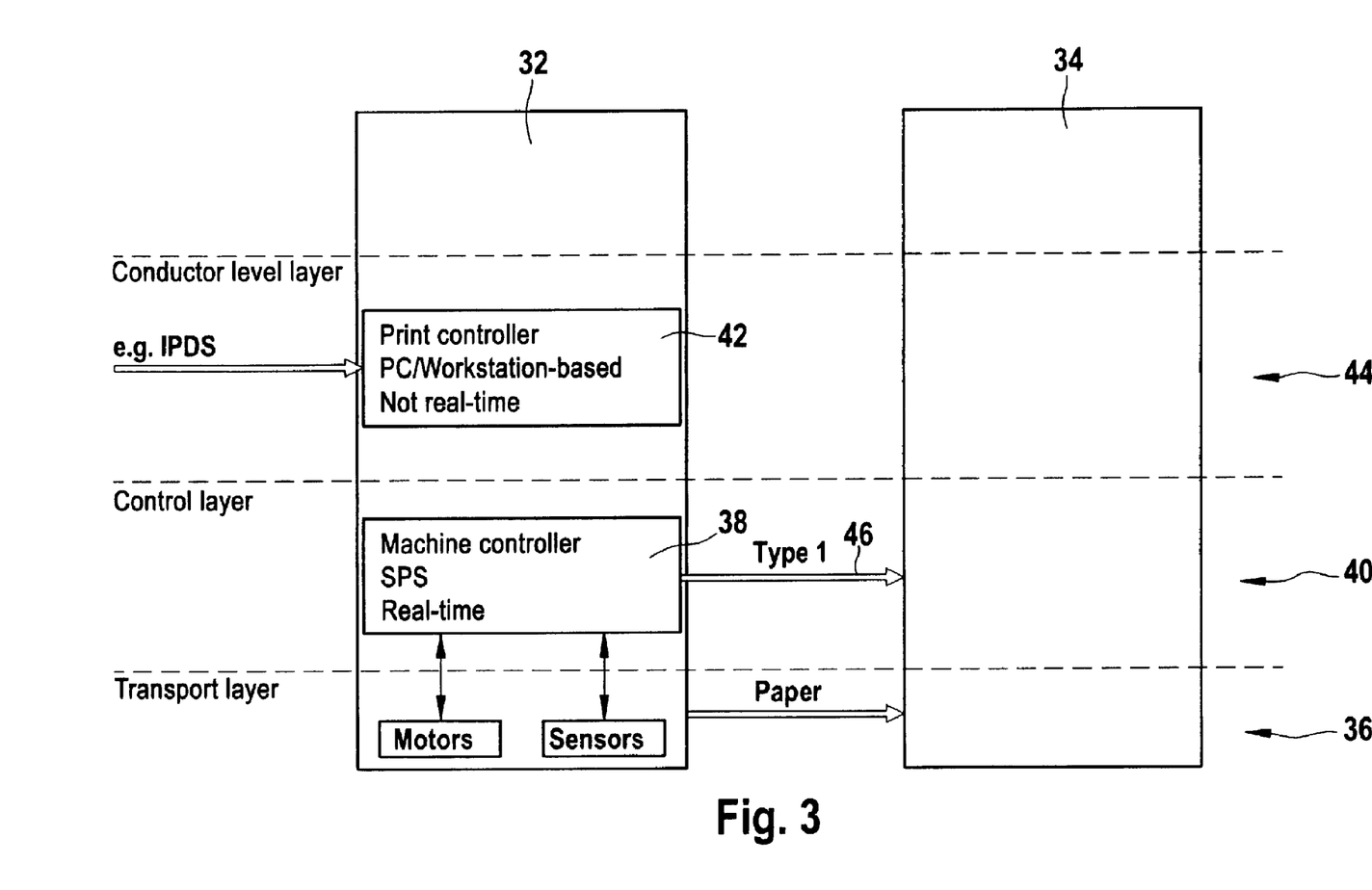
FIG. 3 shows the layer distribution of provided processing layers between two processing units in a data transfer via a Type 1 interface.

The layer distribution of processing layers between two processing units 32, 34 in a data transfer via the Type 1 interface is presented in FIG. 3. A transport layer 36 pertains to the transport of the web-shaped substrate material between the processing units 32, 34. The processing unit 32 in the exemplary embodiment according to FIG. 3 is an image generation unit, and the processing unit 34 is a buffer unit arranged after the image generation unit 32 in the paper travel direction to buffer the web-shaped substrate material. At the level of the transport layer 36 the image generation unit 32 has motors and sensors that cause and monitor the transport of the substrate material. Corresponding to the actuation of the web-shaped substrate material, this is transported through the image generation unit 32 and further on to the buffer 34. A control layer 40 is provided above the transport layer 36. The image generation unit 32 has a converter unit 38 that forms a control layer 40 in the image generation unit 32. A conductor level layer 44 is provided above the converter unit 40. The image generation unit 32 has a data processing unit 42 that forms the conductor level layer 44 in the image generation unit and processes data that is not real-time-relevant, in particular a supplied print data stream. The control of the motors and sensors on the transport layer 36 occurs in real time, without large delays, with the aid of the converter unit 38. The converter unit 38 serves as a machine controller and is advantageously a memory-programmable controller (SPS). The real-time-relevant paper travel signals are provided by the memory-programmable controller 38 via the Type 1 interface and are transferred at the level of the control layer 40 to an additional processing unit 34 in the form of signals transferred via at least one signal line per signal.

Figure 4:
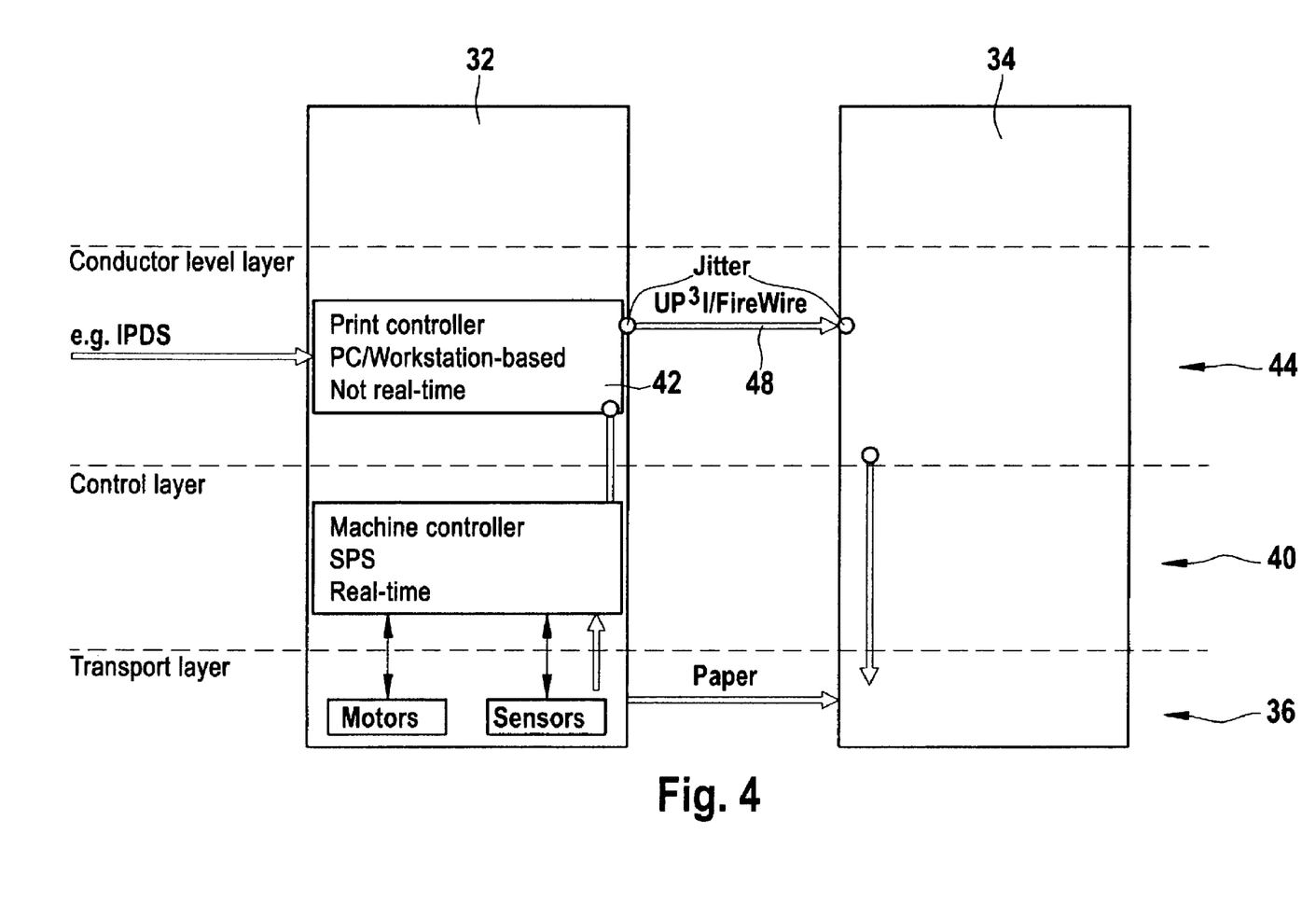
FIG. 4 shows the layer distribution of provided processing layers between two processing units in a data transfer via $UP^3I$ Firewire according to $UP^3I$.

A layer distribution of the processing layers between the processing units 32 and 34 is presented in FIG. 4 in an embodiment alternative to the layer distribution presented in FIG. 3. In contrast to FIG. 3, in the embodiment according to FIG. 4 the transfer of control information between the processing units 32 and 34 occurs on the conductor level layer 44 via a Firewire connection 48 according to the UP³I standard. The problem thereby occurs that the control information relevant to the paper travel is transferred from the converter unit 38 to the data processing unit 42 and on the conductor level layer 40 via the Firewire data connection to a data processing unit (not shown) of the processing unit 34. The data processing unit 42 and the data processing unit (not shown) of the processing unit 34 enable only a non-real-time-capable data transfer between the processing units 32 and 34 on the conductor layer, such that unforeseeable time delays (what are known as jitter) occur in the transfer of real-time-relevant data via the data connection at the conductor layer that exhibit a time offset of the control information relative to the actual paper travel at the transport layer 36. Depending on the specification of the conductor level layer 44, the control layer 40 and the paper layer 36, an additional delay can result in the conversion of the transferred information in the processing unit 34.

Figure 5:
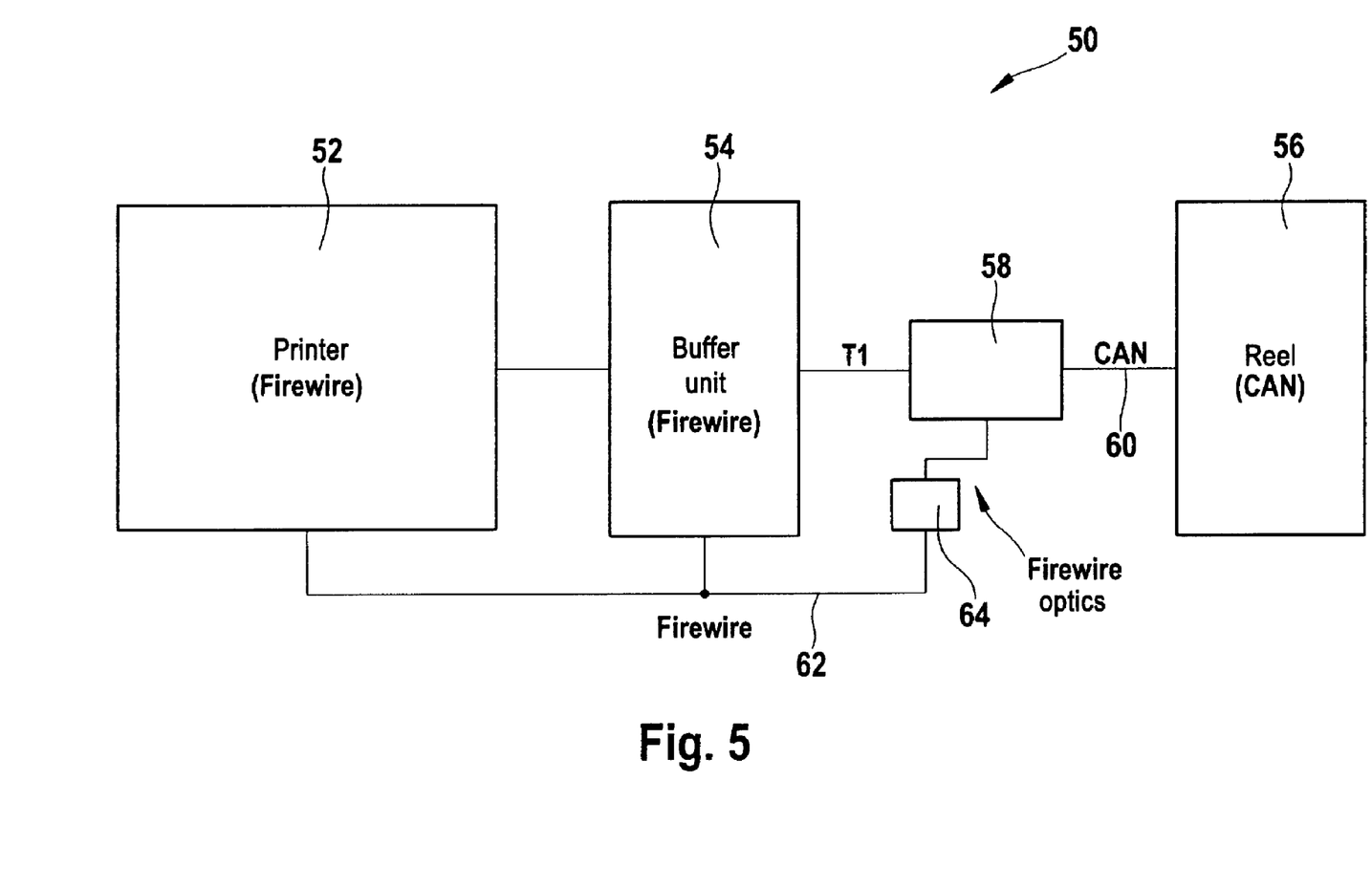
FIG. 5 illustrates a block diagram with three processing units and a conversion of control signals of the Type 1 interface into CAN bus data.

A block diagram of a printing or copying system 50 with three processing units 52, 54, 56 in total is shown in FIG. 5, wherein the processing unit 52 is an image generation unit that has a UP³I interface according to the UP³I standard 1.20. The processing unit 54 is a buffer to buffer the web-shaped substrate material printed by the image generation unit 52 and has a UP³I interface according to the UP³I standard 1.20. The processing unit 54 additionally provides signals according to a Type 1 interface as signal line-based unidirectional control signals T1. The processing unit 56 is a reel to roll up the processed substrate material. The processing unit 56 has a CAN bus interface. The printing or copying system 50 also has a converter unit 58 that is connected with the processing unit 56 via a CAN bus connection 60. The converter unit 58 is also connected with the processing unit 54 via the signal lines T1 of the Type 1 interface and with the processing units 52 and 54 via a UP³I Firewire connection 62. The Firewire connection 62 is thereby executed as a daisy chain between the processing unit 52 and 54, as well as between the processing unit 54 and a converter 64 and between the converter 64 and the converter box 58. The Firewire connection between the processing unit 52 and 54 as well as between the processing unit 54 and the converter 64 is executed as a wire connection (copper connection), and the connection between the converter 64 and the converter box 58 is executed as an optical data connection. The converter 64 implements the conversion of the wired signals into optical signals and vice versa.

With the aid of the proposed procedure, in addition to a UP³I Firewire interface according to the asserted UP³I standard V1.20 at least one signal line-based control signal is to be provided by at least one processing unit; these UP³I apparatuses can be connected in a simple manner with further processing units or apparatuses that have a real-time-capable data interface, advantageously a real-time-capable bus system for the exchange of control information. It is proposed by the applicant to modify or expand the asserted UP³I standard for future processing units to the effect that the real-time data transfer occurs via a suitable real-time data interface or via a real-time-capable bus system such as the CAN bus system. Older UP$^3$I apparatuses can then be incorporated as well into a real-time control when the signals required for this are provided via the Type 1 interface or as signal line-based hardware signals and are converted by a converter unit into a data format conforming to the real-time-capable data interface.

Given critical applications, the interference resistance can be increased via the optical data transfer shown in FIG. 5. A clock signal for transport of the substrate material is advantageously used as signal line-based control signals, in particular a 1/6 inch clock that corresponds to the movement of the substrate material with a resolution of 1/6 of an inch. It can also be advantageous to provide a paper direction signal as a signal line-based control signal that indicates whether the transport direction of the substrate material is forwards or backwards. The additional signals of the Type 1 interface can additionally or alternatively also be transferred via the existing UP$^3$I Firewire data connection between the processing unit and the converter unit since these signals or the items of control information that are specified by the signals are not so time-critical that they absolutely mandate a real-time processing.

Signal states are also transmitted in a signal line-dependent manner in what is known as the Type 2 interface in the same manner as described for the Type 1 interface. The Type 1 interface and the Type 2 interface are interfaces that are kept very simple for signal exchange, which interfaces are typically controlled by an apparatus controller (memory-programmable controller). Such memory-programmable controllers must be real-time-capable (at least in the high-capacity printing field) and respectively evaluate sensor data at the correct point in time and activate the corresponding actuators. The signals of the Type 1 interface and of the Type 2 interface thus exhibit a high temporal precision. Very simple signals that also be processed via pure hardware modules (i.e. without software) are also exchanged via the Type 1 interface and via the Type 2 interface. Such hardware modules can in particular be FPGA components or CPLD components. A Firewire interface is generally provided at the conductor layer only in a personal computer or in a control panel of a personal computer of the printing or copying system. Such a personal computer thereby comprises operating system software that supports the data transfer via the Firewire interface. Such operating systems are, for example, Microsoft Windows or a Linux derivative. A high time precision of the paper travel information in its transfer between the processing units in particular enables paper buffers to be spared between processing units that otherwise must be provided (in particular before and/or between post-processing units) for a reliable operation of the printing or copying system. The high time precision required for this cannot be achieved in practice with the aid of Firewire and known standard operating systems. Given provision of real-time operating systems, a disproportionately higher processing effort by the personal computer is required, whereby a significant additional expenditure is required to ensure a real-time data transfer via a Firewire interface.

The signal line-based control signals of the Type 1 interface and the Type 2 interface are already present in every apparatus controller or can be determined in a simple manner. The signal line-based control signals can be directed out from the respective processing unit via the plug connectors generally used for the Type 1 interface and Type 2 interface, or via alternative plug connectors.

The control information to be transferred in a printing system can be simply, reliably transferred via the provision of the real-time-capable CAN bus and the optional network connection, and the time-critical signals can in particular be transferred in real time between the processing units. Via the proposed solution of the connection of two processing units via the converter box, processing units with different data interfaces can be connected relatively simply, wherein a high time precision of the control information is achieved for transmission for time-critical signals. In particular, existing UP$^3$I apparatuses according to the effective UP$^3$I standard V1.20 can be connected with newer apparatuses in a simple manner with a CAN bus interface, and if necessary with optional network interfaces.

The data transfer between the data processing units is thus advantageously divided up into a first layer (machine control layer) and a second layer (workflow layer). The first layer is thereby in particular executed as a daisy chain and comprises basic control information for processing of the substrate material, such as paper length, offset, paper movement etc. A real-time processing is absolutely necessary for this information transferred with the aid of this first layer. Due to the simple, uncomplicated signals or information, only a small bandwidth is required for data transfer from processing unit to processing unit. The first transfer layer can simply be provided by a machine controller (such as a memory-programmable controller) that is already used to control the respective processing unit, without fundamental modifications being required. A point-to-point communication that in particular serves to provide management functions occurs in the second transfer layer. Such management functions are in particular page tracking, the provision of graphical user interfaces, data exchange according to SNMP, continuative configurations of the printing system, Plug and Play configurations from processing units to a printing system. A relatively large bandwidth for data transfer is required for the transmission of such information. However, the necessity of real-time processing is not posed for the transfer of these types of information. The transfer in the second transfer layer in particular occurs between data processing units such as workstations or personal computers.

In addition to the data to provide the graphical user interfaces, for information regarding transfer according to SNMP program data for firmware upgrades and print data can also be transferred via the network connection. Information regarding data integrity can also be transferred via the network connection.

The preferred embodiment can advantageously be used in electrographic printing or copying apparatuses whose recording methods for image generation are in particular based on the electrophotographic, magnetographic or ionographic recording principles. The printing or copying apparatuses can also use a recording method for image generation in which an image recording medium is directly or indirectly electrically activated point-by-point. However, the preferred embodiment is not limited to such electrographic printing or copying apparatuses.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A converter unit to transfer real time control data and non-real time data between at least first and second processing units of a printing or copying system, comprising:
   a first real time control data interface according to a first interface standard for exchange of said real time control data via a first real time data connection between the converter unit and said first processing unit, said first real time data connection comprising at least one signal line associated with only one real time control signal providing at least some of said real time control data to said first control data interface;
   a second real time control data interface according to a second interface standard for exchange of said real time control data between the converter unit and the second processing unit;
   a first non-real time data interface for exchange of said non-real time data between the converter unit and the first processing unit;
   a second non-real time data interface comprising a network interface for exchange of said non-real time data between the converter unit and the second processing unit via a network data connection; and
   a control unit for converting a signal state of said real time control signal into data conforming to said second real time control data interface according to said second interface standard and said control unit then outputting said real time control data via said second real time control data interface, and said control unit converting said real time control data supplied to the converter unit as said real time control signal into a signal curve of said real time control signal and outputting said signal curve as said real time control data to said second processing unit.

2. The converter unit according to claim 1 wherein the first non-real time data interface is configured only for non-real time data transfer.

3. The converter unit according to claim 1 wherein said network interface being connectible via a switched network connection with the second processing unit.

4. The converter unit according to claim 3 wherein the network interface of the converter unit enables a non-real time network connection.

5. The converter unit according to claim 1 wherein the second real time control data interface is an interface of a real time bus system.

6. The converter unit according to claim 1 wherein the at least one signal line to transfer the control signal is executed as a wire connection.

7. The converter unit according to claim 1 wherein the converter unit is executed as a separate module, or the module is integrated into the second processing unit.

8. The converter unit according to claim 1 wherein the control signal comprises a paper travel signal.

9. The converter unit according to claim 1 wherein parameters to control processing of at least one print page are transferred via the first real time control data interface.

10. The converter unit according to claim 9 wherein the parameters pertain to length of a print page, width of a print page, or specifications regarding at least one post-processing.

11. The converter unit according to claim 1 wherein the real time control data of the at least one control signal and at least a part of parameters required to control processing of a print page in a computer program system are transferred via the second real time control data interface.

12. The converter unit according to claim 11 wherein the first real time data interface, together with a control signal interface of the first processing unit, forms a control current loop via the at least one signal line associated with the control signal and a reference potential, or via two control lines associated with the control signal.

13. The converter unit according to claim 12 wherein the control interface has connection points to connect signal lines, wherein at least one connection point is provided for each control signal.

14. The converter unit according to claim 1 wherein the control signal comprises a binary input signal or a binary output signal, wherein the first real time control data interface has at least one binary input for the binary input signal that can be connected with the control line, and wherein the first real time control data interface has at least one binary output for the binary output signal that can be connected with the control line.

15. The converter unit according to claim 1 wherein the converter unit converts at least one part of the real time control data transferred via the first real time control data interface into data conforming to the interface and transfers said data via the second real time control data interface to the second processing unit.

16. A method to transfer real time control data and non-real time data between at least first and second processing units of a printing or copying system, comprising the steps of:
   providing a converter unit between said first and second processing units;
   providing a first real time control data interface of said converter unit according to a first interface standard for exchange of said real time control data via a first real time data connection between the converter unit and said first processing unit, said first real time data connection comprising at least one signal line associated with only one real time control signal providing at least some of said real time control data to said first control data interface;
   providing a second real time control data interface of said converter unit according to a second interface standard for exchange of said real time control data between the converter unit and the second processing unit;
   providing a first non-real time data interface of said converter unit for exchange of said non-real time data between the converter unit and the first processing unit;
   providing a second non-real time data interface of said converter unit comprising a network interface for exchange of said non-real time data between the converter unit and the second processing unit via a network data connection;
   providing a control unit of said converter unit; and
   with said control unit converting a signal state of said real time control signal into data conforming to said second real time control data interface according to said second interface standard and then outputting said real time control data via said second real time control data interface, and with said control unit converting said real time control data supplied to the converter unit as said real time control signal into a signal curve of said real time control signal and outputting said signal curve as said real time control data to said second processing unit.

* * * * *